United States Patent [19]
Voda et al.

[11] 3,766,451
[45] Oct. 16, 1973

[54] METALLIZED CAPACITOR WITH WIRE TERMINALS

[75] Inventors: Edward R. Voda; Bernard A. Johnson, both of McCook, Nebr.

[73] Assignee: TRW Inc., Los Angeles, Calif.

[22] Filed: Sept. 15, 1972

[21] Appl. No.: 289,208

[52] U.S. Cl............ 317/260, 317/101 CC, 317/242, 317/322
[51] Int. Cl................................................ H01g 1/14
[58] Field of Search............ 317/261, 260, 101 CC, 317/101 C, 242; 338/318, 329, 322; 29/630 A, 630 F

[56] References Cited
UNITED STATES PATENTS

| | | | |
|---|---|---|---|
| 3,496,283 | 2/1970 | Andrafay | 338/322 |
| 567,223 | 9/1896 | Dean | 338/318 |
| 1,900,206 | 3/1933 | Silberstein | 338/318 |
| 2,003,625 | 6/1935 | Boyer | 338/318 |
| 2,820,934 | 1/1958 | Mullikin | 317/261 |
| 3,124,721 | 3/1964 | Rayburn | 317/101 CC |
| 3,195,027 | 7/1965 | Vandermark | 317/261 X |
| 3,390,312 | 6/1968 | England | 317/260 |
| 3,626,086 | 12/1971 | Rubey | 317/101 CC |
| 3,686,535 | 8/1972 | Piper | 317/261 |

FOREIGN PATENTS OR APPLICATIONS

| | | | |
|---|---|---|---|
| 852,790 | 11/1960 | Great Britain | 317/260 |
| 870,329 | 3/1960 | Great Britain | 317/260 |
| 342,336 | 4/1936 | Italy | 317/260 |

*Primary Examiner*—E. A. Goldberg
*Attorney*—Spensley, Horn & Lubitz

[57] ABSTRACT

Terminal units for metallized capacitors. A capacitor utilizing metallized dielectric layers is convolutely wound into a compact unit having a pair of regions represented by metallized layers separated by the dielectric. Each transverse end of the convolutely wound layers provide a region for making electrical contact thereto. Sturdy terminal units having predetermined geometry are coupled to the segregated metallized regions, the terminal units adapting the capacitor for use with automatic insertion equipment and reflow soldering techniques.

4 Claims, 5 Drawing Figures

PATENTED OCT 16 1973 3,766,451
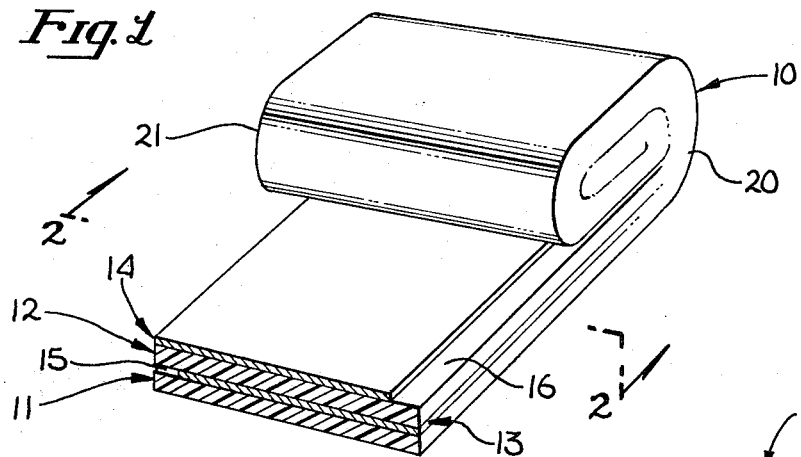
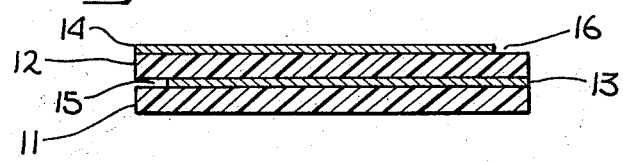
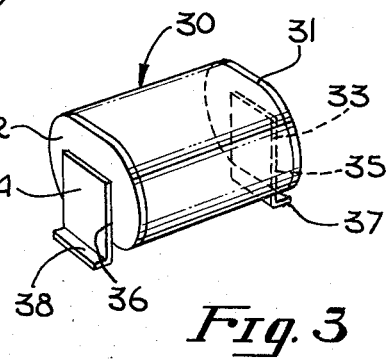
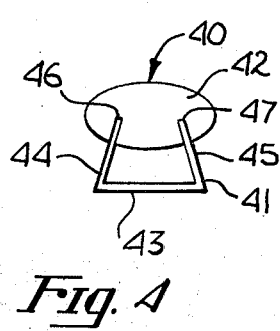
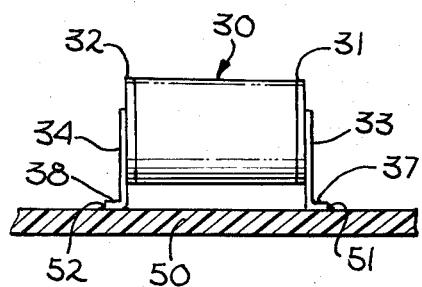

METALLIZED CAPACITOR WITH WIRE TERMINALS

BACKGROUND OF THE INVENTION

1. Field of the Invention

The present invention generally relates to terminal units for electrical components and, more particularly, to those terminal units adapting the electrical components for use with automatic insertion equipment and reflow soldering techniques.

2. Prior Art

The prior art discloses many types of contact units used to terminate electrical components in general and in particular electrical capacitors. The typical terminal used for electrical capacitors comprises a small gauge wire electrically secured to each of the metallized portions of the capacitor which are separated by the appropriate dielectric used. This type of termination has long been used where discrete components are manually mounted within the appropriate circuit. The problems inherent in this type of construction are evident when the device is to be used with automatic insertion systems and where the component is to be mounted utilizing reflow soldering techniques. Wire leads tend to tangle in shipment and therefore are subject to damage which will make the components substantially unusable in automatic insertion systems. In addition, the strength of the wire attached in only a single location is not sufficient where stress will be imposed upon the termination by the insertion technique being used. A third defect in this conventional termination is that there is no uniformity to the terminations and therefore the electrical component will not have structural stability when mounted within the assembly.

Another type of terminal disclosed for use in electrical capacitors utilizes a wire which is formed into a substantially circular base which is perpendicular to the direction of the terminal unit, the base portion of the wire being secured to each of the electrical regions of the capacitor. The defect inherent in this type of design is substantially similar to those described hereinabove. The use of a wire terminal depending from a metallized end of an electrical capacitor provides a poor means for providing inter-connection between the capacitor and a circuit. Since there is a non-uniform surface to make contact to when mounting the device, it will be structurally unstable. In addition, the use of terminal leads which can become bent or otherwise deformed during shipment will render the electrical component substantially unusable when automatic insertion equipment is utilized.

The present invention substantially resolves those deficiencies existing in the devices disclosed by the prior art. After convolutely winding one or more cooperating strips of metallized dielectric into a circular or substantially elipitical structure, the axial ends thereof are prepared for making contact with the respective electrical regions of the capacitor. The present invention terminals constitute rigid geometrical configurations which can be mounted in a co-planar manner to the axial end portions of the capacitor to provide for a uniform, structurally stable mounting for the capacitor. The present invention terminals adapt the capacitor assembly for use with automatic insertion equipment and for use with reflow soldering techniqes.

SUMMARY OF THE INVENTION

The present invention comprises improved terminal units for electrical capacitors. The increased use of electronic systems for varying applications has placed increased emphasis on cost effectiveness and therefore on the yield of discrete components capable of being properly installed within the larger assemblies. These problems have related to damage during the transport of electrical capacitors and the inability to properly utilize the capacitor with automatic insertion equipment or pursuant to reflow soldering techniques. These problems have arisen because of the structural instability of the terminal leads previously used as well as the damage which occurred to the components during shipment.

The present invention utilizes a metallized capacitor which has been convolutely wound in a manner which will suitably expose the regions for electrical contact at either axial end of the wound capacitor. The axial ends of the capacitor are normal to the axis of the wound capacitor and therefore contact thereto should be made co-planar with the axial ends. The present invention utilizes sturdy terminal units substantially defining a planar surface, the terminal units being coupled to the axial ends of the capacitor assembly in a manner which places the terminals normal to the axis of the convolutely wound capacitor.

The present invention terminals provide a sturdy base for mounting same within circuit assemblies, are amenable for use with automatic insertion equipment and can be utilized with reflow soldering techniques. Since the present invention terminals obviate the structural instability incident with the ordinary wire leads, the electrical capacitors manufactured in accordance with the present invention are capable of substantially withstanding damage during shipment.

It is therefore an object of the present invention to provide improved terminal units for electrical capacitors.

It is another object of the present invention to provide improved terminal units for electrical capacitors which are structurally sturdy and capable of withstanding damage during shipment.

It is still another object of the present invention to provide improved terminal units for electrical capacitors which can fully utilize the capability of automatic insertion equipment and reflow soldering techniques.

It is still yet another object of the present invention to provide improved terminal units for electrical capacitors which are inexpensive and simple to fabricate.

The novel features which are believed to be characteristic of the invention, both as to its organization and method of operation, together with further objectives and advantages thereof, will be better understood from the following description considered in connection with the accompanying drawing in which a presently preferred embodiment of the present invention is illustrated by way of example. It is to be expressly understood, however, that the drawing is for the purpose of illustration and description only, and is not intended as a definition of the limits of the invention.

BRIEF DESCRIPTION OF THE DRAWING

FIG. 1 is a perspective view of a partially wound electrical capacitor utilizing metallized dielectric layers.

FIG. 2 is a cross-sectional view of a portion of metallized dielectric layers taken through line 2—2 of FIG. 1.

FIG. 3 is a perspective view of a wound electrical capacitor utilizing terminal units in accordance with the present invention.

FIG. 4 is an end view of a wound electrical capacitor utilizing another form of terminal units in accordance with the present invention.

FIG. 5 is a side, elevation view of an electrical capacitor made in accordance with the present invention mounted upon a circuit assembly.

DESCRIPTION OF THE PRESENTLY PREFERRED EMBODIMENT

An understanding of the type of electrical capacitor used with the present invention can be best understood by reference to FIG. 1 and FIG. 2 wherein a partially unwound capacitor and cross-section thereof are shown, the capacitor being generally designated by reference numeral 10. It is to be understood that the manner of fabricating a capacitor utilizing metallized dielectric as set forth hereinbelow is for the purpose of illustration only, the present invention being usable with metallized capacitors made in accordance with other methods of fabrication.

Referring to FIG. 1 and FIG. 2, a typical capacitor assembly using the present invention terminal structure is shown. Dielectric sheets 11 and 12 are provided, a portion of each of the dielectric sheets 11 and 12 are provided with metallized layers disposed thereon, the metallized layers being generally designated by the reference numerals 13 and 14 respectively. Margins 15 and 16 of dielectric sheets 11 and 12 respectively extend the full extent of the shown longitudinal edges of dielectric sheets 11 and 12 and typically will prevent the occurrance of destructive voltage breakdowns along the edges of the dielectric capacitor 10. Metallized dielectric layer 11 is placed adjacent metallized dielectric layer 12, metallized layer 13 disposed on dielectric layer 11 being in contact with the unmetallized surface of metallized dielectric layer 12. As can be seen in FIG. 1 and FIG. 2, metallized layers 13 and 14 are electrically isolated from each other, margins 15 and 16 preventing any electrical arcing between metallized layers 13 and 14.

After the metallized dielectric layers 11 and 12 are aligned as shown in FIG. 2, the aligned layers are convolutely wound to form electrical capacitor 10. As can be seen from FIG. 1 and FIG. 2, the convolutely wound capacitor 10 provides access to the segregated metallized layers 11 and 12. When convolutely wound as shown in FIG. 1, axial end 20 will provide access to metallized layer 13 and axial end 21 will provide access to metallized layer 14. As shown in FIG. 1, the convolutely wound capacitor 10 is substantially eliptical when looking at the cross-section thereof, although it is understood that capacitor 10 could be circular in cross-section. In addition, axial ends 20 and 21 of capacitor 10 are substantially normal to the longitudinal axis of electrical capacitor 10 thereby providing for contact thereto in a manner consistent with the present invention.

As mentioned, the present invention terminal units are usable with metallized capacitors. Dielectric layers 11 and 12 are comprised of a known, suitable material adequate to provide the dielectric constant necessary in the specific application. A suitable material for electrical capacitor 10 has a high dielectric constant and is quite thin thereby providing for the necessary miniaturization needed for components used within modern equipment. The material used to fabricate electrical capacitor 10 are typically conventional materials such as polycarbonate, polystyrene, polyurethane or polyesters.

Metallized layers 13 and 14 which are disposed upon dielectric layers 11 and 12 respectively, are formed utilizing conventional, known methods such as vacuum evaporation, the method used for deposition not being part of the present invention. The materials used to fabricate metallized layers 13 and 14 are conventional materials used for making electrical contact such as zinc, aluminum, lead or silver, the specific material not being part of the present invention.

Referring now to FIG. 3, a capacitor utilizing terminal units in accordance with the present invention is shown therein, the capacitor being generally designated by the reference numeral 30. Capacitor 30 is a metallized capacitor generally fabricated in accordance with that described in connection with FIG. 1 and FIG. 2. The axial ends of capacitor 30 constitute metallized electrical regions separated by the defined dielectric material used to fabricate capacitor 30. In order to provide a proper medium for coupling terminals to capacitor 30, the metallic axial ends are prepared for receiving the terminals. A metallic end coating is disposed upon the axial ends by conventional, known methods, such as a sprayable solder flux known in the industry as schooping. Schooping layers 31 and 32 are normal to the longitudinal axis of capacitor 30 and thereby provide for suitable, sturdy terminations thereto. Terminal units 33 and 34 are coupled to schooping layers 31 and 32 respectively by conventional methods such as soldering or welding. The form of the present invention shown in FIG. 3 utilizes solid members 35 and 36 to implement the contacting portion of terminal units 33 and 34 respectively. Members 35 and 36 constitute terminal units which define a planar surface. Contact members 35 and 36 are adapted to be coupled to schooping layers 31 and 32 to provide contacts which are coplanar with schooping layers 31 and 32 respectively and which will be normal to the longitudinal axis of capacitor 30. As described hereinabove, an object of the present invention is to provide terminal units which provide means whereby electrical capacitors are easily usable with automatic insertion equipment and with reflow soldering techniques. The form of the present invention shown in FIG. 3 illustrates members 37 and 38 depending outwardly from the bottom terminus of contacting members 35 and 36 respectively. Members 37 and 38 are in a planar relationship with each other and are substantially perpendicular to contacting members 35 and 36. Members 37 and 38 can be integral with contacting members 35 and 36 respectively or can be separately coupled to the respective contact terminals.

To provide the sturdy structure required as an objective of the present invention, terminal units 33 and 34 provide sturdy terminal units which are coupled to schooping layers 31 and 32 across a broad surface thereof. In opposition to the connection by a single wire, the solid connection between the electrical regions of capacitor 30 and terminal units 33 and 34 provide a capacitor assembly which will not be easily damaged in shipment. In addition, terminal units 33 and 34 provide a symmetrical configuration which can therefore be easily used with automatic insertion equipment. Lastly, since members 37 and 38 of terminal units 33 and 34 respectively, constitute a broad contacting area, they are easily used with reflow soldering techniques.

Another form of the present invention is shown in FIG. 4, FIG. 4 illustrating another form of the present invention terminal units being used with a metallized capacitor being generally designated by the reference numeral 40. Capacitor 40 is substantially the same as that discussed in connection with FIG. 3, the axial ends thereof being normal to the longitudinal axis of capacitor 40. As shown in FIG. 4, terminal 41 is coupled to axial end 42 of capacitor 40, the plane defined by terminal 41 being substantially coplanar with axial end 42 and being normal to the longitudinal axis of capacitor 40. The form of the present invention shown in FIG. 4 utilizes terminal 41 which is comprised of base member 43 and a pair of side members 44 and 45. Side members 44 and 45 are substantially equal in length and depend from base 43. As shown in FIG. 4, side members 44 and 45 can be formed by depending same from base 43 and folding same inwardly toward each other. The interval defined by ends 46 and 47 of side members 44 and 45 is smaller than the linear distance of base 43. By providing a form of the present invention as shown in FIG. 4, a solid base for capacitor 40 is provided by base 43, substantial contact being enabled by the portions of side members 44 and 45 which are coupled to axial ends 42. Terminal end 41 is coupled to axial end 42 in the same manner as described in connection with FIG. 3. Although only a single terminal is shown in FIG. 4, it is understood that the second terminal for capacitor 40 is fabricated in substantially the same way as heretofore described.

The mounting of a capacitor utilizing terminal units in accordance with the present invention is shown in FIG. 5, the capacitor shown therein utilizing the same reference numerals as used in connection with FIG. 3 for the purpose of clarity. Capacitor 30 utilizes terminal units 33 and 34 which are coupled to schooping layers 31 and 32 respectively as previously described. Since terminals 33 and 34 are structurally strudy, provide a uniform base and are substantially symmetrical, capacitor 30 can be utilized with automatic insertion equipment for placement on printed circuit board 50 as shown in FIG. 5. The mounting of capacitor 30 on circuit board 50 will typically utilize reflow soldering techniques whereby base members 37 and 38 are disposed upon solder pads 51 and 52 respectively. After placement of capacitor 30 on circuit board 50 utilizing automatic insertion equipment, conventional reflow soldering techniques are used to provide an appropriate coupling between solder pads 51 and 52 and members 37 and 38 respectively.

The forms of the present invention described in connection with FIGS. 3, FIG. 4 and FIG. 5 are illustrative of the scope of the present invention. The use of terminal units which define a single planar surface which will provide planar contact between the terminals and the axial ends of the metallized capacitors can be achieved in other forms. For example, the form of the present invention shown in FIG. 3 and FIG. 5 need not require members 37 and 38, but can be implemented through a terminal similar to contact members 35 and 36 alone. In addition, members 37 and 38 can be oriented in the opposite direction shown, the orientation merely being dependent on the receiving surface. The present invention provides terminal units for electrical capacitors which are easily fabricated and substantially resolve problems which have heretofore not been solved by the terminal units described in the prior art. Terminal units fabricated in accordance with the present invention are inexpensive and easy to fabricate, cannot be easily damaged in shipment and provide for component assemblies which can utilize modern fabrication techniques.

We claim:

1. In metallized convolutely wound capacitors having a pair of electrodes at the ends thereof, the electrodes being metallized electrical regions separated by a suitable dielectric, electrical terminals for the capacitor comprising a pair of metallic contact members each defining a uniform planar surface, each of said contact members being connected to one of the electrical regions of the metallized capacitor normal to the longitudinal axis thereof, each of said contact members having a base member and a pair of equal side members, said side members depending from opposite ends of said base member and being folded upon themselves and defining an interval between the terminus thereof which is less than the length of said base member.

2. Terminals as defined in claim 1 wherein said base members are parallel to each other, and define a plane which is uniformly spaced from the longitudinal axis of the metallic capacitor.

3. A convolutely wound metallized capacitor having a pair of separate, electrode regions at the axial ends thereof for making contact thereto, the axial ends being normal to the longitudinal axis of the metallic capacitor, first and second metallic contact members each comprising a base member and a pair of equal side members, each of said side members depending from opposite ends of said base member and being folded upon themselves forming a planar surface, the interval between the terminus of said members being less than said base member the side members of each of said first and second metallic contact members being connected to one of the axial ends of the metallic capacitor normal to the longitudinal axis of the metallic capacitor.

4. Terminal units as defined in claim 3 wherein said base members are parallel to each other and define a planar surface which is uniformly spaced from the longitudinal axis of the metallic capacitor.

* * * * *